US008164662B2

(12) United States Patent
Rueckert et al.

(10) Patent No.: US 8,164,662 B2
(45) Date of Patent: Apr. 24, 2012

(54) IMAGE-PROCESSING DEVICE FOR COLOR IMAGE DATA AND METHOD FOR THE IMAGE PROCESSING OF COLOR IMAGE DATA

(75) Inventors: Ingo Rueckert, Burkau (DE); Oliver Vietze, Frauenfeld (CH); Joachim Ihlefeld, Dresden (DE)

(73) Assignee: Baumer Optronic GmbH, Radeberg (DE)

( * ) Notice: Subject to any disclaimer, the term of this patent is extended or adjusted under 35 U.S.C. 154(b) by 67 days.

(21) Appl. No.: 12/377,549

(22) PCT Filed: Aug. 17, 2007

(86) PCT No.: PCT/EP2007/007289
§ 371 (c)(1),
(2), (4) Date: Sep. 28, 2010

(87) PCT Pub. No.: WO2008/019867
PCT Pub. Date: Feb. 21, 2008

(65) Prior Publication Data
US 2011/0134291 A1    Jun. 9, 2011

(30) Foreign Application Priority Data
Aug. 17, 2006 (DE) .................. 10 2006 038 646

(51) Int. Cl.
*H04N 9/083* (2006.01)
*G06K 9/64* (2006.01)
*G06K 9/32* (2006.01)
*G06K 9/56* (2006.01)
*G09G 5/00* (2006.01)
*G06F 17/15* (2006.01)
*G06F 17/10* (2006.01)

(52) U.S. Cl. ........ 348/280; 348/273; 382/279; 382/300; 382/205; 345/615; 708/420; 708/300; 708/315

(58) Field of Classification Search .......... 348/273–281; 382/205, 279, 167, 162, 298–301, 307; 708/300, 708/315, 420; 345/615, 613
See application file for complete search history.

(56) References Cited

U.S. PATENT DOCUMENTS 6,366,692 B1    4/2002  Acharya
2004/0017487 A1*  1/2004  Ueda .......................... 348/222.1

FOREIGN PATENT DOCUMENTS
WO        92/03795 A1    3/1992
(Continued)

OTHER PUBLICATIONS

Agnes Wittmann-Regis, "International Preliminary Report on Patentability", Apr. 23, 2009, Publisher: PCT.

(Continued)

*Primary Examiner* — Sinh Tran
*Assistant Examiner* — Mark Monk
(74) *Attorney, Agent, or Firm* — DeMont & Breyer, LLC (57) ABSTRACT

A digital image-processing device with a Bayer sensor and an image memory is provided in which the image data of the sensor is written into an image memory, and from this image memory, image data in the Bayer format with a length L and a width B is written continuously into a data buffer, and in which the sample values are combined by means of a computational device with the help of adders, in each case symmetrically to a central point of one or more $(2n+1)\times(2n+1)$ neighborhoods, and one or more $(n+1)\times(n+1)$ matrices are derived by means of the computational device, and from this $(n+1)\times(n+1)$ matrix or these matrices, with the help of additional adders, at least one $n\times n$ matrix is formed, and a first color component is in each case calculated from this by means of an adder network.

16 Claims, 5 Drawing Sheets

FOREIGN PATENT DOCUMENTS

WO          00/72262 A1    11/2000

OTHER PUBLICATIONS

David Alleysson et al, Color demosaicing by estimating luminance and opponent chromatic signals in the Fourier domain, Swiss Federal Institute of Technology (EPFL), XP-002476542.

Manfred Kopp, "Efficient filter computation with symmetric matrix kernels", Institute of Computer Graphics, Visualization and Animation Group, Technical University of Vienna, XP-002476543.

PCT, International Search Report and Written Opinion, dated Apr. 15, 2008.

PCT, International Preliminary Examination Report, dated May 30, 2008.

* cited by examiner

| 0 G 3,-3 | 0 B 3,-2 | 0 G 3,-1 | 0 B 3,0 | 0 G 3,1 | 0 B 3,2 | 0 G 3,3 |
|---|---|---|---|---|---|---|
| 12 R 2,-3 | 12 G 2,-2 | 60 R 2,-1 | 24 G 2,0 | 60 R 2,1 | 12 G 2,2 | 12 R 2,3 |
| 12 G 1,-3 | 48 B 1,-2 | 60 G 1,-1 | 96 B 1,0 | 60 G 1,1 | 48 B 1,2 | 12 G 1,3 |
| 12 R 0,-3 | 12 G 0,-2 | 60 R 0,-1 | 24 G 0,0 | 60 R 0,1 | 12 G 0,2 | 12 R 0,3 |
| 12 G -1,-3 | 48 B -1,-2 | 60 G -1,-1 | 96 B -1,0 | 60 G -1,1 | 48 B -1,2 | 12 G -1,3 |
| 12 R -2,-3 | 12 G -2,-2 | 60 R -2,-1 | 24 G -2,0 | 60 R -2,1 | 12 G -2,2 | 12 R -2,3 |
| 0 G -3,-3 | 0 B -3,-2 | 0 G -3,-1 | 0 B -3,0 | 0 G -3,1 | 0 B -3,2 | 0 G -3,3 |

IMAGE-PROCESSING DEVICE FOR COLOR IMAGE DATA AND METHOD FOR THE IMAGE PROCESSING OF COLOR IMAGE DATA

FIELD OF THE INVENTION

The invention relates, in general, to the processing of color images, in particular, the processing of raw data into displayable formats.

BACKGROUND OF THE INVENTION

Currently, typical color image sensors nearly all work with a so-called Bayer matrix or with Bayer sensors. In such sensors a color filter arrangement is arranged on the sensor surface, wherein a color filter for a certain color is inserted in front of each pixel and the colors are weighted differently. The most common are RGB color filters, wherein green pixels are twice as frequent as blue and red.

SUMMARY OF THE INVENTION

The raw data of such an image, however, is not displayable on standard displays. For this purpose, a conversion is generally performed wherein the signals of several pixels of the sensor are interpolated. Here there is generally the problem that such conversions can generate artifacts, such as color fringes, or are computationally intensive, so that among other things they are not suitable for real-time display. In addition, a conversion process, for example, into RGB values like those used in common image formats, is lossy. The invention is therefore based on the task of disclosing a more effective conversion of color image data that is simple enough that it can also be easily implemented as hardware and that allows true-color, low-artifact displays in real time.

A precise processing of the sensor signals is a basic requirement for achieving high image quality from single-chip color cameras. For this purpose, digital methods are increasingly used. As a rule, especially high requirements are placed on the quality of signal processing if the cameras are used, e.g., for image-processing tasks or for printed image control. At the same time, processing in real time is required. Often the image is needed in real time at several resolutions simultaneously, e.g., for image processing at full resolution and for display at reduced resolution.

The requirements call for a signal-processing design that is based on as large as possible a neighborhood; as a rule this means a minimum of 7×7 pixels for high quality requirements. In order to process such a neighborhood, it is known, e.g., to write $n \geq 7$ row memories with image data and to read 7 pixels in the column direction for each pixel cycle. This concept, however, stands in contrast to an efficient memory organization of modern image memories that contain DDRAMs (double data rate random access memories) as memory components that can realize only row-oriented block accesses with high efficiency. Large integrated SRAM areas require chip area, and are therefore disadvantageous.

Therefore, the task of the invention consists initially in creating an optimized memory interface that can support both operation with DDRAMs as image memories and also the formation of large neighborhoods of sizes greater than 7×7 pixels, in real time.

Accordingly, the invention provides a digital image-processing device with a Bayer sensor and an image memory, wherein the image data of the sensor is written into an image memory and, from this image memory, image data in the Bayer format is written continuously into a data buffer, and the sample values are combined by means of a computational device with the help of adders, in each case symmetrically to a central point of one or more (2n+1)×(2n+1) neighborhoods, and one or more (n+1)×(n+1) matrices are derived from these neighborhoods by means of the computational device, and from these matrices or with at least one matrix derived from these matrices a first color component in each case is calculated by means of an adder network. This color component can be, in particular, a high-resolution component YH that reproduces the gray value or brightness distribution in the image. It is also possible to form at least one n×n matrix from the (n+1)×(n+1) matrix or matrices with the help of additional adders, when the (n+1)×(n+1) matrix (matrices) is (are) symmetric. The calculation of the matrix operation is advantageously performed by convolution with a suitable convolver, in particular, a convolver of the size (n+1)×(n+1), or especially preferably, if the matrix can be further reduced in size, with a convolver of the size n×n.

An especially effective calculation is possible here if the sample values are combined by means of a computational device with the help of adders, in each case symmetrically to a central point of one or more (2n+1)×(2n+1) neighborhoods with n=3, that is, correspondingly by means of a 7×7 convolver.

Several, typically 4, phase-dependent, multiplexed adder networks are further provided for calculating the R, G, B proportions of a second and a third color component (the signals X and Z of the XYZ color space). The R, G, B proportions of the second and third color components, advantageously the signals X and Z of the XYZ color space or U, V of the YUV, color space can then be multiplied with programmable weight factors and summed into the second and third color components.

An especially effective and fast use of memory is realized, furthermore, when the image data in Bayer format is continuously written into the data buffer with a length L of at least 32 pixels, advantageously exactly 32 pixels, and a width B of at least 8 pixels, advantageously exactly 8 pixels.

In addition to the first color component it is also advantageous to calculate by means of the computational device, from the n×n matrix, a fourth color component with lower spatial resolution (YL) relative to the first color component by means of another adder network. Instead of the first color component (YH), this fourth color component can be used for calculating color correction, wherein a signal derived from the difference of the first and—advantageously weighted—fourth color component (YH−YL) is added to the corrected output signal. The two color components YH and YL here can be weighted with different multipliers in order to adapt the sizes of the two components in the difference formation to each other. Thus, in a refinement it is provided to use the difference YH−118*YL. A simple, effective sharpness filter can be realized in this way.

The invention is eminently suitable for, among other things, generating focused images from image series. For this purpose, in a refinement of the invention a digital image-processing device is provided that has an adjustable lens that is computer-controlled, advantageously in multi-focus operation, or that is connected to a camera with such a lens. Then the image-processing device can be designed to calculate, in addition to the first color component, a fourth color component having a lower spatial resolution (YL) than that of the first color component, and to map the difference signal between the first color component and the fourth color component onto a non-linear function $$f(\text{Contrast}(x,y)) = f(YH(x,y) - YL(x,y))$$

where YH(x,y) designates the first color component with higher spatial resolution and YL(x,y) designates the fourth color component with lower spatial resolution. Here, the non-linear function is advantageously selected so that all of the values of the function are not negative, wherein both the digital color image weighted with the non-linear function and also the weights during a focusing cycle are summed in a memory, and wherein the summed color image is multiplied with the inverse value of the summed weights, advantageously after completion of the focusing cycle.

Thus, for the summed digital image I(x,y) the following is valid:

$$I(x, y) = \frac{\sum_i f(\text{Contrast } (x, y))_i I(x, y)_i}{\sum_i f(\text{Contrast } (x, y))_i}$$

Here, i designates the image index of the recorded image series and I(x,y) designates the intensity value of a pixel at the location with coordinates x,y.

This embodiment of the invention is especially suitable in connection with a telecentric lens as the optics for the image recording. A preferred application of this embodiment is a microscope. This can then deliver focused images automated by means of the invention.

In a refinement of the invention, the image-processing device can be advantageously designed to normalize the color components to a white value by means of programmable gain settings and to format a first data sequence from the first color component (YH) or alternatively the fourth color component (YL), as well as the second and the third color components. This is beneficial for achieving the most authentic representation possible for the colors of the image data.

In particular, it can also be advantageous for this purpose to transform this first data sequence into a second data sequence with the aid of a Conversion Table (LUT) that is arranged on the input side and that contains the response curve for the human eye. In a refinement of the invention, a third data sequence, with signals $Y^\sim$, $X^\sim - Y^\sim$ and $Z^\sim - Y^\sim$ is then formed from the second data sequence and this third data sequence is multiplied with the programmable coefficients L_gain, a_gain, and b_gain.

Programmable offsets are added to these products to produce a fourth data sequence. For the $X^\sim - Y^\sim$ and $Z^\sim - Y^\sim$ assigned values of the fourth data sequence, a product of the first color component and L_gain is added so that a fifth data sequence is produced. This fifth data sequence is transformed back into the linear color space with the inverse Conversion Table or with an adequate approximation through exponentiation—in particular, exponentiation with the third power is suitable—so that a sixth sequence is produced with the signals or color values X, Y, Z.

Often a representation at a certain image size is preset. In order to provide the desired format quickly without large computational effort, a refinement of the invention provides for the calculation and storage of the average value for the sample values of the sensor between two successive rows and columns, so that an image is produced in a memory with twice the interpolated resolution, wherein an address computational device specifies a synchronous series of rational sampling points of a target grid for sampling.

By means of a suitable device of the image-processing device, the color vector can then be selected from the four color components available for each pixel whose address comes closest to the target value. The selected color values can then be subjected to a subsequent color correction. In particular, the image data stream can generally be sampled with a higher resolution, interpolated to twice the resolution, and then output to an end device having lower resolution than that of the sensor-side.

The image data stream that is output to the end device can still be advantageously DCT coded (DCT="Discrete Cosine Transformation") to produce an effective reduction. DCT coding can also be realized very easily through hardware components, such as digital signal processors (DSPs) or multiply-accumulate units (MACs).

Because of the mode of processing the signals according to the invention, the data buffer can comprise, in an especially preferred way, a dual-port RAM. Such memories are indeed small, but because the data is processed in a pipeline process, the image data can be written continuously from the image memory into the dual-port RAM while other image data is simultaneously read again for further processing. This is an essential element to also providing real-time conversion of the image data with reduced artifacts by means of pipeline processing.

BRIEF DESCRIPTION OF THE DRAWINGS

The invention will be explained in greater detail below with reference to the accompanying drawings. Shown are.

DETAILED DESCRIPTION

To achieve the task of creating an optimized memory interface that can support both the operation with DDRAMs as image memories and also the formation of large neighborhoods of a size greater than 7×7 pixels in real time, the raw image data supplied by the sensor is converted by an analog-digital converter (ADU) into digital signals and then stored row-by-row into an image memory made from one or more DDRAMs. After ca. 32 rows have been stored, image data is read from the memory. This process reads short rows with 16 pixel lengths from the image memory and writes these into a fast dual-port RAM that in turn fills a register structure. This scheme makes it possible to reduce the load on the image memory. The resulting data rate during reading is only slightly higher than the data rate of the sensor. In addition, a data rate that is higher by the factor 4 to 8 is achieved at the output for the use of a fast dual-port RAM that is relatively small and thus can be integrated well. In order to avoid time losses during the column jump, the signal processing is advantageously faster than the pixel rate.

Figure 1:
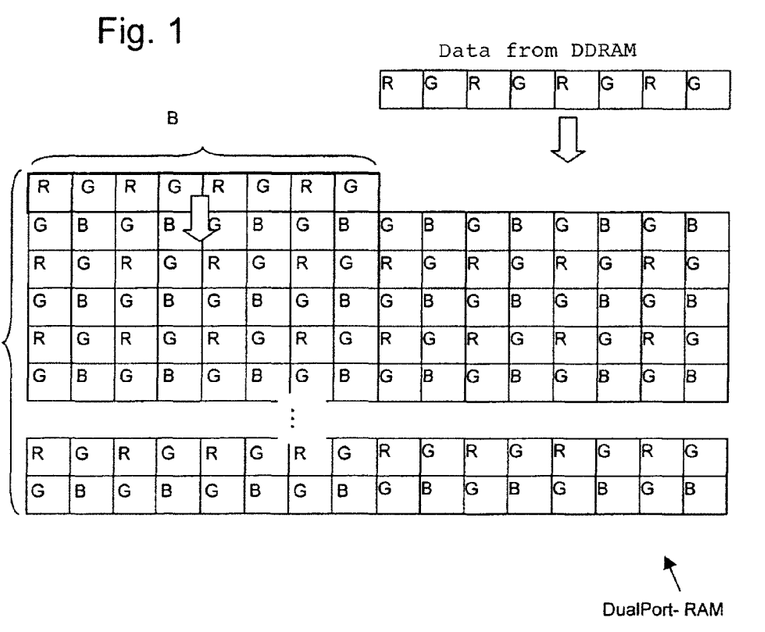
FIG. 1, schematically, reading of the image data into the dual-port RAM.

FIG. 1 shows one example for a Bayer pattern used in single-chip color cameras; other known combinations use, e.g., C, M, Y. For reasons of clarity, however, reference is made only to an RGB pattern. For each color channel, a discontinuous signal is produced that is interpolated in the intermediate spaces. From the DDRAM, as shown in FIG. 1, row-by-row data is transmitted to an internal dual-port RAM. On the other hand, the dual-port RAM is read continuously with a width B (e.g., B=8 pixels), so that a data stream is produced of the size B×L, L being the length of the dual-port RAM (e.g., L=32 pixels). This data stream is read into the convolver structure according to FIG. 2 and processed there. So that two pixels can be processed at the same time a processing width B=8 pixels has proven especially advantageous.

Figure 3:
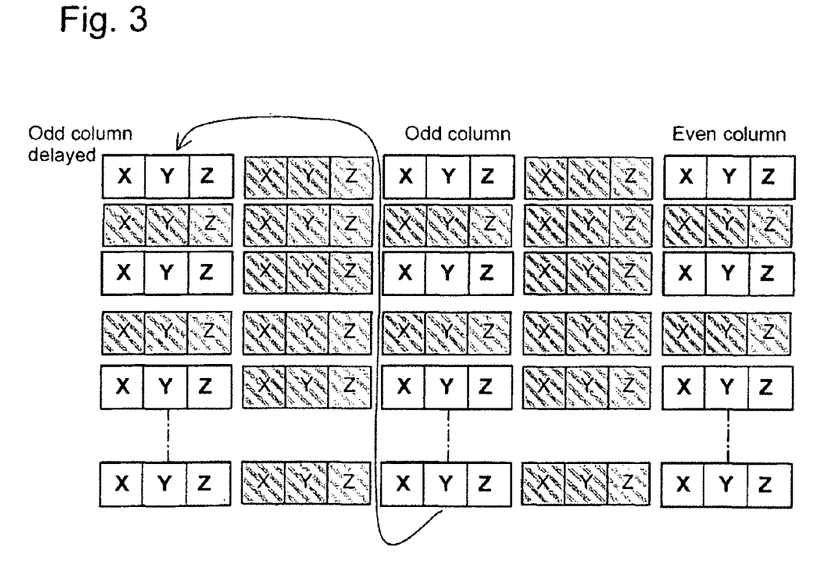
FIG. 3, a data set interpolated to twice the size.

From the columns, two XYZ color values are calculated at a length of ca. 26 pixels (see also farther below). With the help of a register structure, the sample values for a column are delayed so that three sample values of a row are provided at the same time. Therefore, two complete 2×2 neighborhoods can be generated in which the color image can then be linear interpolated to twice the resolution. The resulting data set is shown in FIG. 3, wherein the interpolated data is shown with cross-hatching.

The image interpolated in this way can then be rationally broken down by pixel dropping and scaled to the required resolution, without interfering color fringes becoming visible in the image. For this purpose, the pitch of the target grid for the sampling directions x and y is summed and the interpolation value closest to the result is selected in a not-shown address unit. With this operation a relevant improvement in quality can be achieved, especially for prevailing color contrasts in the red or blue range.

$$YH\_Conv\_4 \times 4 := \begin{bmatrix} 8192 & 6156 & -1864 & 146 \\ 6156 & 3844 & -2052 & 180 \\ -1864 & -2052 & -208 & 0 \\ 146 & 180 & 0 & 36 \end{bmatrix}$$

$$Acc\_4 \times 4 = \frac{1}{4}\begin{pmatrix} 4Pix_{0,0} & [2Pix_{-1,0} + 2Pix_{1,0}] & [2Pix_{-2,0} + 2Pix_{2,0}] & [2Pix_{-3,0} + 2Pix_{3,0}] \\ [2Pix_{0,-1} + 2Pix_{0,1}] & [Pix_{-1,-1} + Pix_{-1,1} + Pix_{1,-1} + Pix_{1,1}] & [Pix_{-2,-1} + Pix_{-2,1} + Pix_{2,-1} + Pix_{2,1}] & [Pix_{-3,-1} + Pix_{-3,1} + Pix_{3,-1} + Pix_{3,1}] \\ [2Pix_{0,-2} + 2Pix_{0,2}] & [Pix_{-1,-2} + Pix_{-1,2} + Pix_{1,-2} + Pix_{1,2}] & [Pix_{-2,-2} + Pix_{-2,2} + Pix_{2,-2} + Pix_{2,2}] & [Pix_{-3,-2} + Pix_{-3,2} + Pix_{3,-2} + Pix_{3,2}] \\ [2Pix_{0,-3} + 2Pix_{0,3}] & [Pix_{-1,-3} + Pix_{-1,3} + Pix_{1,-3} + Pix_{1,3}] & [Pix_{-2,-3} + Pix_{-2,3} + Pix_{2,-3} + Pix_{2,3}] & [Pix_{-3,-3} + Pix_{-3,3} + Pix_{3,-3} + Pix_{3,3}] \end{pmatrix}$$

The general color processing will be described below.

The goal of processing is initially to calculate, from the primary colors, the color components in the normalized XYZ color space, and then to optimally correct these.

If the gains $C_{YR}$, $C_{YC}$, $C_{YB}$ of the channels R, G, B are adapted suitably, an especially simple hardware realization is produced for the case that the sum of the spectral sensitivities $$Y(\lambda) = c_{YR}R(\lambda) + 2c_{YG}G(\lambda) + c_{YB}B(\lambda)$$

$$X(\lambda) = c_{XR}R(\lambda) + c_{XG}G(\lambda) + c_{XB}B(\lambda)$$

$$Z(\lambda) = c_{ZR}R(\lambda) + c_{ZG}G(\lambda) + c_{ZB}B(\lambda)$$

approximately corresponds to the brightness response curve $V(\lambda)$ or the spectral response for the Y signal in the XYZ color space, the other coefficients are optimized for X or Z. Under these conditions, the interpolation can be easily realized with shift-invariant $(2n+1) \times (2n+1)$ convolver. An optimum ratio between cost and performance results for n=3, i.e., a 7×7 convolver, values of the matrix rounded:

$$YH\_Conv\_7 \times 7 := \begin{bmatrix} 9 & 0 & 45 & 73 & 45 & 0 & 9 \\ 0 & -52 & -513 & -932 & -513 & -52 & 0 \\ 45 & -513 & 961 & 3078 & 961 & -513 & 45 \\ 73 & -932 & 3078 & 8192 & 3078 & -932 & 73 \\ 45 & -513 & 961 & 3078 & 961 & -513 & 45 \\ 0 & -52 & -513 & -932 & -513 & -52 & 0 \\ 9 & 0 & 45 & 73 & 45 & 0 & 9 \end{bmatrix}$$

Here, the interpolating filter that includes, by definition, low-pass characteristics, was combined with a phase-optimized 5×5 sharpness filter. This does not rule out attainability of good results with a different matrix. For example, each value of the above matrix can also differ by a factor of up to 1.5, rounded to whole numbers. The 7×7 environment is here formed independent of the pixel color. Thus the color component calculated in this way can be obtained for each pixel independent of the color.

If the Bayer signal is convolved with such a convolver, a sharp gray-value image YH(x,y) is produced. In order to minimize the complexity of the convolution operation, the following operations are performed:

Initially, the coefficients of the matrix were optimized so that a cost-effective realization with a minimum number of fast adders is sufficient without multipliers. Specifically, the calculation is further supported by the central symmetry of the matrix YH_Conv_7×7. The convolution can therefore be realized in significantly simpler fashion with the matrices YH_Conv_4×4 and Acc_4×4:

The matrix Acc_4×4 maps, with central symmetry, the 4 quadrants of the 7×7 neighborhood to one quadrant, and is normalized to the summed pixels. Accordingly, the values $Pix_{a,b}$ designate the image data of the pixels at relative positions a, b to the central point, for which the color value is to be calculated.

Figure 2:
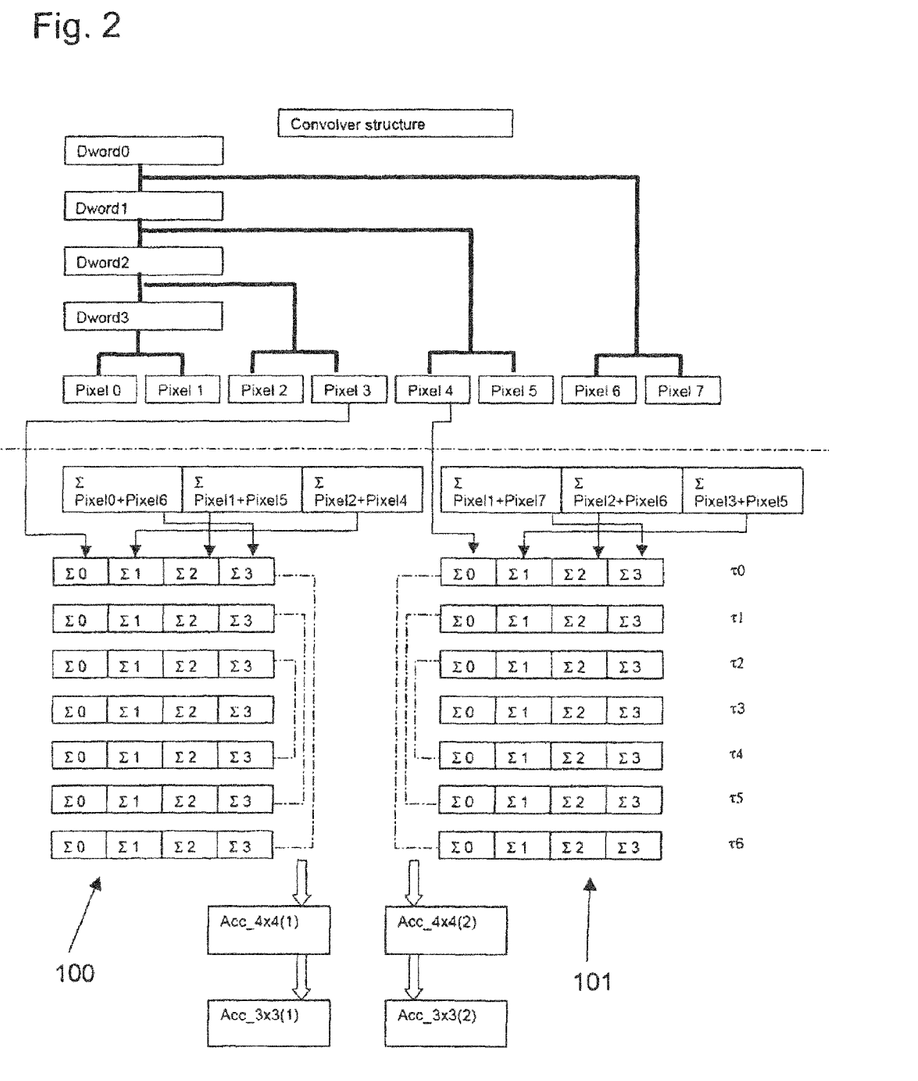
FIG. 2, a convolver structure of the image-processing device.

The matrix Acc_4×4 is formed by means of the structure shown in FIG. 2, preferably through the addition of the gray values of the pixels Pixel0+Pixel6, Pixel1+Pixel5, Pixel2+Pixel4, and also Pixel1+Pixel8, Pixel2+Pixel7, Pixel3+Pixel6. Pixel3 for the left strip and Pixel4 for the right strip are passed along directly into the 4×7 register 100, 101. Then a sum is performed in the vertical direction, shown with dashed lines in FIG. 2.

Another simplification of the calculation is possible through summation into 3×3 matrices YH_Conv_3×3 and also Acc_3×3:

$$YH\_Conv\_3 \times 3 := \begin{bmatrix} 8192 & 12312 & -3728 \\ 292 & 3844 & -4104 \\ 360 & -208 & 36 \end{bmatrix}$$

$$Acc\_3 \times 3 = \frac{1}{2}\begin{bmatrix} 2Acc\_4 \times 4_{1,1} & Acc\_4 \times 4_{1,2} + Acc\_4 \times 4_{2,1} & Acc\_4 \times 4_{3,1} + Acc\_4 \times 4_{1,3} \\ Acc\_4 \times 4_{4,1} + Acc\_4 \times 4_{1,4} & 2Acc\_4 \times 4_{2,2} & Acc\_4 \times 4_{3,2} + Acc\_4 \times 4_{2,3} \\ Acc\_4 \times 4_{2,4} + Acc\_4 \times 4_{4,2} & 2Acc\_4 \times 4_{3,3} & 2Acc\_4 \times 4_{4,4} \end{bmatrix}$$

Due to the symmetrical properties, the convolution operation with the matrix YH_Conv_4×4 can be reduced to a 3×3 matrix YH_Conv_3×3. The associated neighborhood is calculated through the addition of matrix elements with the same coefficients from Acc_4×4.

Obviously, the entries into the matrices Acc_4×4 and YH_Conv_4×4 are each permuted in the same way without changing the convolution result. The same also applies for the corresponding simplified matrices Acc_3×3 and YH_Conv_3×3.

The matrix YH_Conv_3×3 can be further simplified by breaking it down into three matrices m1, m2, and m3, so that the physical realization can be performed with adders of optimized word width and thus minimal complexity:

$$m1 := \begin{bmatrix} 2 & 3 & -1 \\ 0 & 1 & -1 \\ 0 & 0 & 0 \end{bmatrix}$$

$$m2 := \begin{bmatrix} 0 & 0 & 3 \\ 3 & -2 & 0 \\ 3 & -2 & 0 \end{bmatrix}$$

$$m3 := \begin{bmatrix} 0. & 10. & -8. \\ -22.7 & 6. & -10. \\ -4.4 & 11.1 & 9.15 \end{bmatrix}$$

$$m3a := \begin{bmatrix} 0 & 8 & -8 \\ -24 & 8 & -8 \\ -4 & 12 & 8 \end{bmatrix}$$

It follows:

YH_Conv_3×3=4096*m1+128*m2+4*m3;

The coefficients of the matrix YH_Conv_7×7 were optimized so that the convolution result with the matrix m3 is negligible for most cases, because textures occurring in real images do not correlate with the pattern of the matrix and the convolution result consequently converges to zero. When necessary, the matrix m3 or also, to good approximation, the matrix m3a can be expanded.

Figure 4:
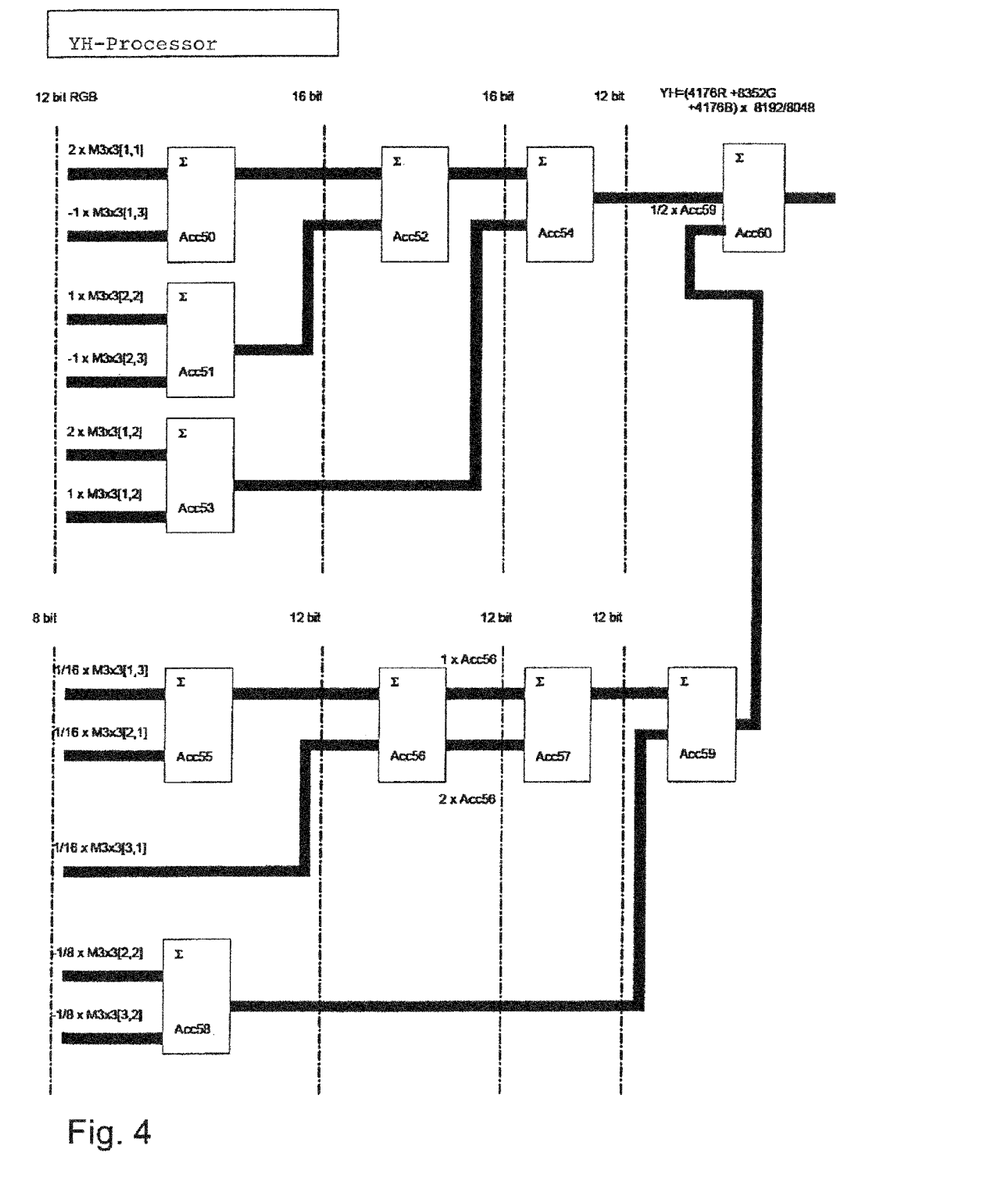
FIG. 4, a simplified basic circuit of a YH convolver of the image-processing device, and FIG. 5, a block circuit diagram of an optimized pipeline processor for calculating the color data, FIG. 6, a 7×7 pixel cut-out of a Bayer pattern with weighting factors for the calculation of an RGB vector of the central pixel.

Therefore, the YH convolver can be realized with the simplified basic circuit according to FIG. 4. As an example, for a homogeneous area, one obtains the result (rounded):

$YH = 4251c_RR + 8502c_GG + 4251c_BB$

For the color calculation, a second YL signal is used that is not high-pass filtered, in contrast to YH.

YL can be calculated through convolution of Acc_3×3 with YL_Conv_3×3:

$$YL\_Conv\_3\times 3 := \begin{bmatrix} 16 & 48 & 16 \\ 0 & 36 & 24 \\ 0 & 4 & 0 \end{bmatrix}$$

This calculation can be advantageously realized with a structure according to FIG. 3. From this, one obtains for a homogenously colored area:

$YL = 36c_RR + 72c_GG + 36c_BB$

The differential signal $\Delta Y$ $\Delta Y = \alpha(YH - 118YL)$ is preferably added, weighted at the output of the output converter, so that an efficient 7×7 sharpness filter, adjustable in real time with the coefficient $\alpha$, can be realized. The processing of the Y signals is herewith completed.

The color calculation is performed in the XYZ color space. For this purpose, four independent color interpolations UV1, UV2, UV3, UV4 are provided that are associated with the four shifts of the central point that can be realized in the 7×7 neighborhood with respect to the Bayer pattern. A convolution with the matrix Acc_4×4 is performed, wherein the color proportions of RGB are output separately.

For the case in which the central point of the 7×7 neighborhood falls on a red or blue pixel, the convolution can be performed with the environment Acc_3×3 that was already used for the calculation of YH. The total of four possible convolutions with the matrices Color M1, Color M2, Color M3, Color M4 can be constructed in parallel, and thus four complete color vectors for a Bayer pattern with red, green, and blue pixels, that is, vectors <R,G,B>, can be generated, of which each valid one is selected by means of a multiplexer.

The matrices ColorM1 to ColorM4 are listed in the following Table 1 together with matrices M1 to M4. The matrices M1 to M4 each correspond to the matrix Acc_4×4 specified above, and map the environment about the central pixel of the 7×7 environment in the Bayer pattern. As is easy to see in comparison with the matrix Acc_4×4, the entry at the top left in these matrices M1 to M4 is in each case the central pixel. In the Bayer pattern with two green pixels, and for each of these one red and one blue, there are a total of four possible pixel patterns or four shifts of the central point that can be realized in the 7×7 neighborhood with respect to the Bayer pattern. One of the matrices ColorM1, . . . , ColorM4 is associated with each of these cases, and the convolution of the pixel values is performed with this respective matrix. Obviously these matrices can also be transmitted to another Bayer pattern as an RGB Bayer pattern, wherein the entry "G" in the matrices M1, . . . , M4 in this case corresponds to the pixel with the most common color.

TABLE 1

$$M1: \begin{bmatrix} G & 2R & 2G & 2R \\ 2B & 4G & 4B & 4G \\ 2G & 4R & 4G & 4R \\ 2B & 4G & 4B & 4G \end{bmatrix} \quad ColorM1 := \begin{bmatrix} 24 & 96 & 24 & 0 \\ 60 & 60 & 60 & 0 \\ 12 & 48 & 12 & 0 \\ 12 & 12 & 12 & 0 \end{bmatrix}$$

$$M2: \begin{bmatrix} R & 2G & 2R & 2G \\ 2G & 4B & 4G & 4B \\ 2R & 4G & 4R & 4G \\ 2G & 4B & 4G & 4B \end{bmatrix} \quad M2\_3\times 3: \begin{bmatrix} R & 4G & 4R \\ 4G & 4B & 8G \\ 8B & 4R & 4B \end{bmatrix} \quad ColorM2 := \begin{bmatrix} 64 & 80 & 64 \\ 16 & 100 & 40 \\ 40 & 16 & 4 \end{bmatrix}$$

$$M3: \begin{bmatrix} B & 2G & 2B & 2G \\ 2G & 4R & 4G & 4R \\ 2B & 4G & 4B & 4G \\ 2G & 4R & 4G & 4R \end{bmatrix} \quad M3\_3\times 3: \begin{bmatrix} B & 4G & 4B \\ 4G & 4R & 8G \\ 8R & 4B & 4R \end{bmatrix} \quad ColorM3 := \begin{bmatrix} 36 & 72 & 72 \\ 0 & 144 & 75 \\ 0 & 36 & 0 \end{bmatrix}$$

TABLE 1-continued $$M4: \begin{bmatrix} G & 2B & 2G & 2B \\ 2R & 4G & 4R & 4G \\ 2G & 4B & 4G & 4B \\ 2R & 4G & 4R & 4G \end{bmatrix} \qquad ColorM4 := \begin{bmatrix} 24 & 60 & 12 & 12 \\ 96 & 60 & 48 & 12 \\ 24 & 60 & 12 & 12 \\ 0 & 0 & 0 & 0 \end{bmatrix}$$

The matrices ColorM2 and ColorM3 are each 3×3 matrices. In these matrices, the central point of the 7×7 neighborhood falls on a red or blue pixel, so that further reduction in the 3×3 matrices is possible.

The factors in front of the symbols "R," "G," "B" in the matrices M1, . . . , M4 indicate how many different pixels are added. With reference to matrices M1 to M4, it is also evident which of the color vectors of each is valid, because the matrix entries of these matrices follow the same pattern as the Bayer pattern. For example, if the central point is a green pixel in a row of the Bayer pattern with a sequence green-red-green-red . . . , then this position corresponds to the color pattern of the matrix M1. Accordingly, a valid <R,G,B> vector for the green pixel is generated through the convolution of the matrix ColorM1 with the environment Acc_4×4.

In contrast, for a green color pixel, if the row of the Bayer pattern with this pixel is set with alternating green and blue pixels, the matrix ColorM4 is convolved accordingly with the environment Acc_4×4. For red and blue pixels, the matrices ColorM2 and ColorM3 are used, wherein these matrices are convolved with the environment Acc_3×3, in order to calculate the valid color vectors.

Figure 6:
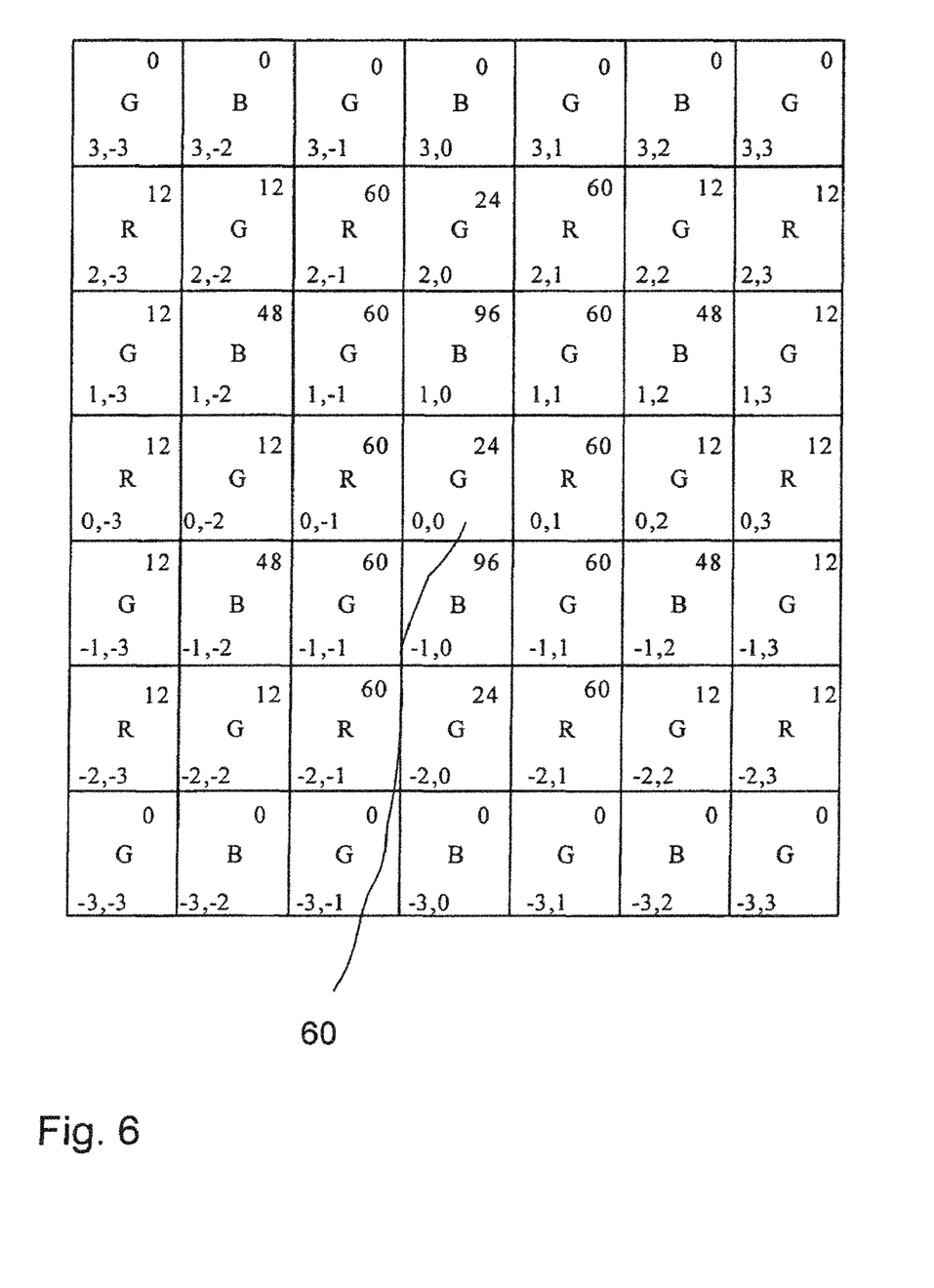

The calculation of an interpolated color vector is explained again graphically with reference to the example shown in FIG. 6. FIG. 6 shows a 7×7 environment of a green color pixel 60. In the middle of the fields, the respective color of the pixels is symbolized with the letters "R," "G," "B." The pixel 60 is arranged in a row with red and green pixels. A comparison with the matrices M1, . . . , M4 shows that the matrix M4 with the central pixel at the top left has the same color pattern. Accordingly, a valid <R,G,B> vector for the pixel 60 is generated by convolution of the pixel values of the 7×7 environment with the matrix ColorM1. The factors of the matrix ColorM1 are in each case recorded at the top left into the individual fields. The indices i, j of the pixels of the environment are in each case recorded in the fields at the bottom left.

The assignment of the factors is realized with reference to the matrix Acc_4×4, wherein each pixel is multiplied, as specified in the matrix Acc_4×4, with the factors from the matrix ColorM1. Thus the central pixel Pix0,0 in the matrix Acc_4×4 is at the position (1,1). The matrix ColorM1 specifies for this position a factor 24 with which the value of this pixel is multiplied. The multiplier at the position (3,2) in ColorM1 is 48. To that effect, according to the matrix Acc_4×4 the pixel values of the pixels that are spaced one row and two columns from the central pixel, that is, the pixels with the indices (−1,−2), (−1,2), (1,−2), and (1,2), are multiplied with this factor 48.

Unlike in the calculation of the color component YH, the values of the individual colors are added and output separately by the hardware-implemented convolver for the calculation of the color vector.

For further simplification, coefficients, e.g., the number 12 for ColorM1, 4 for ColorM4, and 36 for ColorM2, ColorM3 can be factored out and balanced with the subsequent multipliers.

In this way one obtained, for each phase position of the Bayer pattern, [R,G,B] values that are interpolated with respect to the local environment, of which values the respective, valid value is passed along via a multiplier.

The position-interpolated color values <R,G,B> are then weighted each with 3 respective coefficients, so that a best-possible agreement with the spectrum of the normalized color values X or Z is achieved.

For a homogeneously colored area, the selected coefficients for each of the phase positions produce an identical output signal in the form $$X = 144c_{XR}R + 144c_{XG}G + 144c_{XB}B$$

$$YL = 36c_R R + 72c_G G + 36c_B B$$

$$Z = 144c_{ZR}R + 144c_{ZG}G + 144c_{ZB}B$$

With these equations or a computational device designed for calculating the equations, the X, YL, Z color values can then be calculated for the interpolated <R, G, B> color vectors assigned to the pixels.

Thus, on the output of the computational device, an X, YL, Z signal that conforms to the CIE Lab color model is produced. Furthermore, the contrast signal YH−118YL is provided. The white balance (<XN, YN, ZN>) can also be produced with the coefficients.

To achieve optimal adaptation of the image representation by means of a monitor, it is to be taken into account that the human eye is adapted differently for viewing the original image and viewing a monitor. This is especially apparent for the representation of microscope images, since (dark) structures with high density in color and contrast that can be viewed well in the microscope can be only poorly represented on the monitor. Therefore, a transformation is needed that transforms the subjective color perception from a first operating point (e.g., microscope) into a second operating point (e.g., monitor in a bright environment) as much as possible without subjectively discernible color changes. According to the known state of the art, this is achieved by a so-called gamma characteristic curve in which, however, color falsifications can appear. Better suited is the CIE Lab model of 1976. For the coefficients L, a, b of this color model:

$$L = 116Y^- - 16$$

$$a = 500X^- - 500Y^-$$

$$b = 200Y^- - 200Z^-$$

with $$X^- = \begin{cases} 7.787\frac{X}{XN} + .138 & \frac{X}{XN} \le .0088656 \\ \left(\frac{X}{XN}\right)^{(1/3)} & .0088656 < \frac{X}{XN} \end{cases}$$

$$Y^- = \begin{cases} 7.787\frac{Y}{XN} + .138 & \frac{Y}{XN} \le .0088656 \\ \left(\frac{Y}{XN}\right)^{(1/3)} & .0088656 < \frac{Y}{XN} \end{cases}$$

-continued $$Z^\sim = \begin{cases} 7.787\frac{Z}{XN} + .138 & \frac{Z}{XN} \le .0088656 \\ \left(\frac{Z}{XN}\right)^{(1/3)} & .0088656 < \frac{Z}{XN} \end{cases}$$

The vector <XN, YN, ZN> is the white point of the device. According to the principles described above, the Lab value of each pixel can be calculated in the image processing device in real time, and then the characteristic curve can be shifted by suitable offsets in the L, a, and b channels and the available color space can be equalized with gain settings for the L, a, and b channels. An optimum sensitivity-suited adaptation of the color quality and simple operation of the color balance of the camera is hereby achieved.

For recording technical or biological objects, it can happen that images have a histogram in which fine red and blue pixels appear frequently and contain essential information, in contrast to the natural color distribution with predominant green or Y component. In this case the resolution of the Bayer pattern is not sufficient. It is therefore useful to sample the image with a higher resolution and then to downscale the interpolated digital image in real time for the monitor display, so that a sharp image impression is produced. It has been shown that CIE Lab-corrected image data from a Bayer pattern can be displayed especially easily with good quality, without subjectively discernible fringe errors, through linear upscaling to twice the resolution in both sampling directions and subsequent pixel dropping. Therefore, blue/red contrasted objects, such as, e.g., red labeling or a microscopic blood image, then also appear on the monitor with sharp contrast.

The back-conversion of the signals is performed in the XYZ color space of the monitor allowing for an interfering light offset with a spectral characteristic that has been shifted relative to the original source, and that can be represented by an offset <L_off, a_off, b_off>. Furthermore, for the most part the dynamic range of the monitor does not correspond to the dynamic range of the source image, so that the gain of the channels L_gain (b/w [black/white] contrast), again (red/green contrast), and b_gain (yellow/blue contrast) corresponding to the CIE Lab 1976 model can also be equalized. Transformation of the equations is useful for a cost-effective hardware realization in real time, Xin, Yin, Zin describe the XYZ input, XYZ the corrected output. The offsets are calculated with an external controller from the standard values <L_off, a_off, b_off>. The signals X~, Y~, Z~ describe the non-linear transformation to the response curve of the eye.

$$X^\sim = -a\_gain\, Yin^\sim + L\_gain\, Yin^\sim + a\_gain\, Xin^\sim + X\_off$$

$$Y^\sim = L\_gain\, Yin^\sim + Y\_off$$

$$Z^\sim = -b\_gain\, Yin^\sim + L\_gain\, Yin^\sim + b\_gain\, Zin^\sim + Z\_off$$

$$X\_off = \frac{1}{500}a\_off - \frac{4}{29}L\_gain + \frac{1}{116}L\_off + \frac{4}{29}$$

$$Y\_off = -\frac{4}{29}L\_gain + \frac{1}{116}L\_off + \frac{4}{29}$$

$$Z\_off = -\frac{1}{200}b\_off - \frac{4}{29}L\_gain + \frac{1}{116}L\_off + \frac{4}{29}$$

Thus, the displayable color values on the monitor can be adapted optimally and in an easily controllable way to the output medium. A lifelike image is produced. The display of fine image details can be adapted by means of the adjustable high-pass filter α(YH−YL). The difference α(YH−YL) can be amplified in a non-linear way with a tangential characteristic curve, so that the color noise in homogeneous areas is reduced without negatively affecting the contour sharpness.

In order to optimize hardware in the pipeline processor for the color correction, it is useful to combine the offsets for the individual color channels by means of the parameters X_off, Y_off, and Z_off, and to provide them before execution of the calculation in real time by means of a computer.

Figure 5:
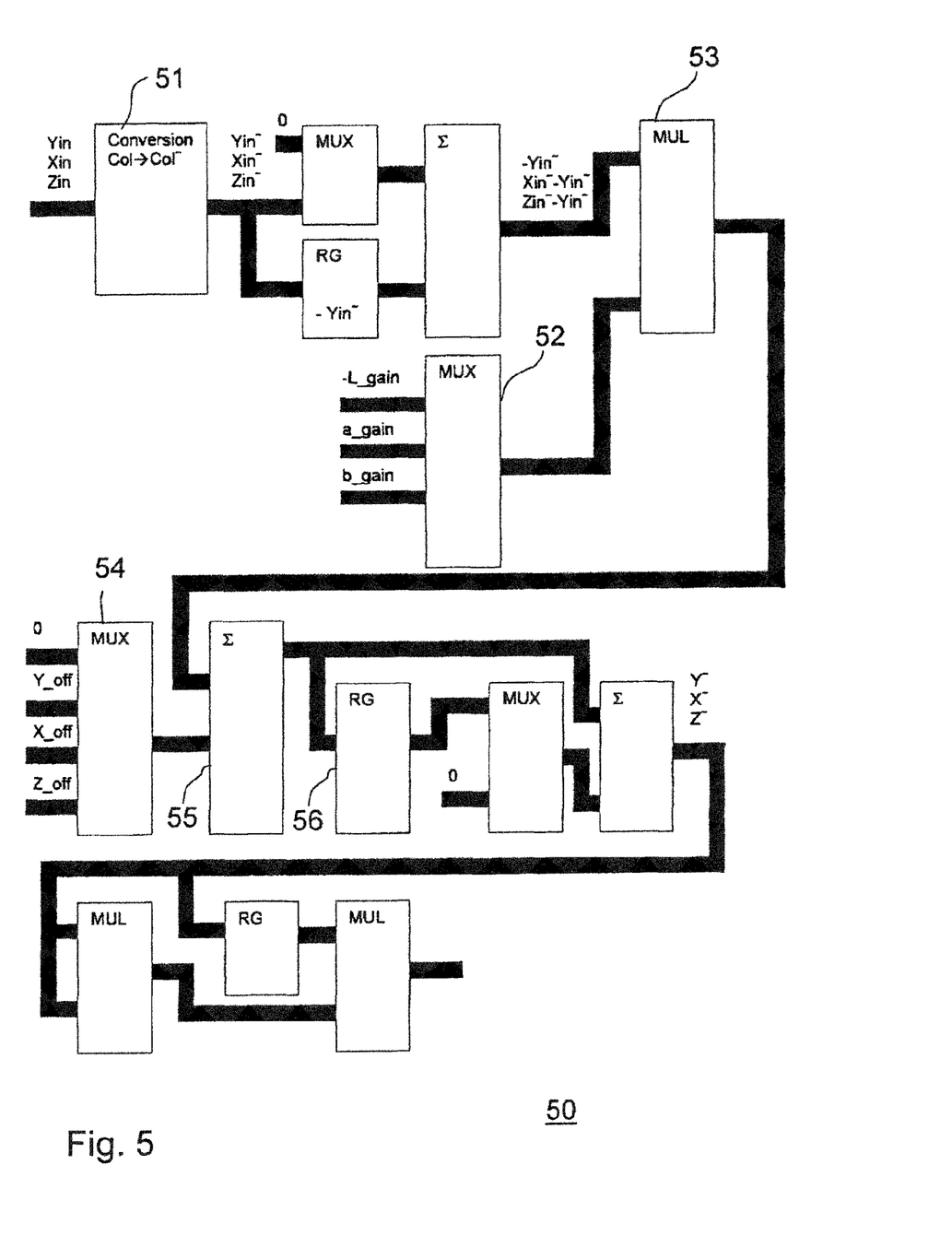

FIG. 5 shows a block circuit diagram of an optimized pipeline processor 50 for calculating the color data. The conversion table 51 at the input contains the table for converting XYZ to X~Y~Z~. The pipeline processor 50 runs with an internal clock at four times the pixel frequency. For this purpose, the XYZ color values are initially multiplexed in the sequence Y, Y, X, Z into a data stream. After conversion, the value Y~ is given a negative sign and stored in a register. So long as Y~ is valid data, the multiplexer is at zero, so that a sequence −Yin~,−Yin~,Xin~−Yin~,Zin~−Yin~ is produced at the output. The subsequent multiplexer 52 and the multiplier 53 together generate a sequence from the products:

L_gain·Yin~,L_gain·Yin~,a_gain·(Xin~−Yin~),b_gain·(Zin~−Yin~), to which offsets are added in the next step by means of the multiplexer 54 and the adder 55, so that a sequence L_gain·Yin~,L_gain·Yin~+Y_off,a_gain·(Xin~−Yin~)+X_off,b_gain*(Zin~−Yin~)+Z_off is produced.

Then the term L_gain*Y~ is stored in a register 56 and added to the terms

L_gain·Yin~,Y_off,a_gain·(Xin~−Yin~)+X_off,b_gain·(Zin~−Yin~)+Z_off so that the desired sequence "undefined,"Y~,X~,Z~, is obtained that can be transformed directly into the linear output sequence Y,X,Z through exponentiation. Here, the bottom part of the characteristic curve can be eliminated for many applications; if not, this part can also be provided by means of the multiplexer with the linear characteristic curve defined in the bottom region.

The invention claimed is:

1. A digital image-processing device comprising:
    a) a Bayer sensor;
    b) an image memory for storing image data from the Bayer sensor, wherein the image data is writable into the image memory, and wherein from the image memory, image data in Bayer format with a length L and a width B is writable continuously into a data buffer; and
    c) a computational device for
        i) combining sample values of the image data by means of adders, in each case symmetrically to a central point of one or more (2n+1)×(2n+1) neighborhoods,
        ii) forming one or more (n+1)×(n+1) matrices from the one or more (2n+1)×(2n+1) neighborhoods,
        iii) calculating, by means of an adder network, a first color component based on the one or more (n+1)×(n+1) matrices, and
        iv) forming, by convolution with a convolver, at least one n×n matrix from the one or more (n+1)×(n+1) matrices.

2. The digital image-processing device according to claim 1, further comprising:
    a plurality of phase-dependent, multiplexed adder networks for calculating R, G, B proportions of a second color component and a third color component; and
    a device for multiplying the R, G, B proportions of the second and third color components with programmable weighting factors, and for then accumulating the results into the second and third color components.

3. The digital image-processing device according to claim 2 comprising exactly four phase-dependent, multiplexed adder networks for calculating the R, G, B proportions of the second and third color components.

4. The digital image-processing device according to claim 2 wherein the R, G, B proportions of the second and third color components that are multiplied are the signals X and Z of an XYZ color space or U, V of a YUV color space.

5. The digital image-processing device according to claim 1, wherein the sample values are combined by means of adders, with n=3.

6. The digital image-processing device according to claim 1, wherein the sample values of a 7×7 neighborhood are convolved for calculating the first color component by means of a 7×7 convolver according to the form $$YH\_Conv\_7\times 7 = \begin{bmatrix} 9 & 0 & 45 & 73 & 45 & 0 & 9 \\ 0 & -52 & -513 & -932 & -513 & -52 & 0 \\ 45 & -513 & 961 & 3078 & 961 & -513 & 45 \\ 73 & -932 & 3078 & 8192 & 3078 & -932 & 73 \\ 45 & -513 & 961 & 3078 & 961 & -513 & 45 \\ 0 & -52 & -513 & -932 & -513 & -52 & 0 \\ 9 & 0 & 45 & 73 & 45 & 0 & 9 \end{bmatrix},$$

or another convolver whose matrix values in each case differ by a maximum of a factor of 1.5 rounded to the nearest whole number from the values of the convolver YH_Conv_7×7.

$$Acc\_4\times 4 = \frac{1}{4}\begin{pmatrix} 4Pix_{0,0} & [2Pix_{-1,0}+2Pix_{1,0}] & [2Pix_{-2,0}+2Pix_{2,0}] & [2Pix_{-3,0}+2Pix_{3,0}] \\ [2Pix_{0,-1}+2Pix_{0,1}] & [Pix_{-1,-1}+Pix_{-1,1}+Pix_{1,-1}+Pix_{1,1}] & [Pix_{-2,-1}+Pix_{-2,1}+Pix_{2,-1}+Pix_{2,1}] & [Pix_{-3,-1}+Pix_{-3,1}+Pix_{3,-1}+Pix_{3,1}] \\ [2Pix_{0,-2}+2Pix_{0,2}] & [Pix_{-1,-2}+Pix_{-1,2}+Pix_{1,-2}+Pix_{1,2}] & [Pix_{-2,-2}+Pix_{-2,2}+Pix_{2,-2}+Pix_{2,2}] & [Pix_{-3,-2}+Pix_{-3,2}+Pix_{3,-2}+Pix_{3,2}] \\ [2Pix_{0,-3}+2Pix_{0,3}] & [Pix_{-1,-3}+Pix_{-1,3}+Pix_{1,-3}+Pix_{1,3}] & [Pix_{-2,-3}+Pix_{-2,3}+Pix_{2,-3}+Pix_{2,3}] & [Pix_{-3,-3}+Pix_{-3,3}+Pix_{3,-3}+Pix_{3,3}] \end{pmatrix}$$

7. The digital image-processing device according to claim 6, wherein the convolver is realized in the form of a 4×4 convolver that has the form $$YH\_Conv\_4\times 4 := \begin{bmatrix} 8192 & 6156 & -1864 & 146 \\ 6156 & 3844 & -2052 & 180 \\ -1864 & -2052 & -208 & 0 \\ 146 & 180 & 0 & 36 \end{bmatrix},$$

or in which the matrix values in each case differ by a maximum of a factor 1.5 rounded to the closest whole number from the values of the convolver YH_Conv_4× 4, and wherein the convolver is convolved with a matrix of the form Acc_4×4 according to the form $$Acc\_4\times 4 = \frac{1}{4}\begin{pmatrix} 4Pix_{0,0} & [2Pix_{-1,0}+2Pix_{1,0}] & [2Pix_{-2,0}+2Pix_{2,0}] & [2Pix_{-3,0}+2Pix_{3,0}] \\ [2Pix_{0,-1}+2Pix_{0,1}] & [Pix_{-1,-1}+Pix_{-1,1}+Pix_{1,-1}+Pix_{1,1}] & [Pix_{-2,-1}+Pix_{-2,1}+Pix_{2,-1}+Pix_{2,1}] & [Pix_{-3,-1}+Pix_{-3,1}+Pix_{3,-1}+Pix_{3,1}] \\ [2Pix_{0,-2}+2Pix_{0,2}] & [Pix_{-1,-2}+Pix_{-1,2}+Pix_{1,-2}+Pix_{1,2}] & [Pix_{-2,-2}+Pix_{-2,2}+Pix_{2,-2}+Pix_{2,2}] & [Pix_{-3,-2}+Pix_{-3,2}+Pix_{3,-2}+Pix_{3,2}] \\ [2Pix_{0,-3}+2Pix_{0,3}] & [Pix_{-1,-3}+Pix_{-1,3}+Pix_{1,-3}+Pix_{1,3}] & [Pix_{-2,-3}+Pix_{-2,3}+Pix_{2,-3}+Pix_{2,3}] & [Pix_{-3,-3}+Pix_{-3,3}+Pix_{3,-3}+Pix_{3,3}] \end{pmatrix}$$

wherein the values $Pix_{a,b}$ designate the image data of the pixels at a position a, b relative to the central point, wherein the matrices YH_Conv_4×4 and Acc_4×4 are permutable in the same way.

8. The digital image-processing device according to claim 1, wherein the image-processing device has a computational device for realizing, for each color pixel of the Bayer filter pattern of the Bayer sensor, complete color vectors through convolution of the neighborhood of a color pixel with one of the matrices $$ColorM1 := \begin{bmatrix} 24 & 96 & 24 & 0 \\ 60 & 60 & 60 & 0 \\ 12 & 48 & 12 & 0 \\ 12 & 12 & 12 & 0 \end{bmatrix},$$

$$ColorM2 := \begin{bmatrix} 64 & 80 & 64 \\ 16 & 100 & 40 \\ 40 & 16 & 4 \end{bmatrix},$$

$$ColorM3 := \begin{bmatrix} 36 & 72 & 72 \\ 0 & 144 & 72 \\ 0 & 36 & 0 \end{bmatrix},$$

$$ColorM4 := \begin{bmatrix} 24 & 60 & 12 & 12 \\ 96 & 60 & 48 & 12 \\ 24 & 60 & 12 & 12 \\ 0 & 0 & 0 & 0 \end{bmatrix},$$

wherein, for the matrices ColorM1 and ColorM2, the convolution with the matrix Acc_4×4 according to the form and for the matrices ColorM2 and ColorM3 with the matrix $$Acc\_3\times 3 := \frac{1}{2}\begin{bmatrix} 2Acc\_4\times 4_{1,1} & Acc\_4\times 4_{1,2}+Acc\_4\times 4_{2,1} & Acc\_4\times 4_{3,1}+Acc\_4\times 4_{1,3} \\ Acc\_4\times 4_{4,1}+Acc\_4\times 4_{1,4} & 2Acc\_4\times 4_{2,2} & Acc\_4\times 4_{3,2}+Acc\_4\times 4_{2,3} \\ Acc\_4\times 4_{2,4}+Acc\_4\times 4_{4,2} & 2Acc\_4\times 4_{3,3} & 2Acc\_4\times 4_{4,4} \end{bmatrix}$$

is realized, wherein the entries in the matrices ColorM1 and ColorM4 are permutable in the same way with the entries of the matrix Acc_4×4, also in the same way, or the entries in the matrices ColorM2 and ColorM3 with the entries of the matrix Acc_3×3.

9. The digital image-processing device according to claim 1, further comprising the computational device for calculating X, YL, and Z color values, from interpolated R G B color vectors that are assigned to the pixels of the Bayer filter pattern of the Bayer sensor, according to the equations:

$$X = 144 c_{XR} R + 144 c_{XG} G + 114 c_{XB} B$$

$$YL = 36 c_R R + 72 c_G G + 36 c_B B$$

$$Z = 144 c_{ZR} R + 144 c_{ZG} G + 144 c_{ZB} B.$$

10. The digital image-processing device according to claim 1, wherein the image-processing device is design to write the image data in the Bayer format with a length L of at least 32 pixels and a width B of at least 8 pixels continuously into the data buffer.

11. The digital image-processing device according to claim 2, wherein the image-processing device is designed to normalize the color components to a white value by means of programmable gain settings and to format a first data sequence from the first color component or alternatively a fourth color component YL, and also the second color component and the third color component.

12. The digital image-processing device according to claim 11, wherein this first data sequence is transformed into a second data sequence with the help of a conversion table (LUT) that is arranged on the input side and that contains the response curve of the human eye.

13. The digital image-processing device according to claim 12, wherein the image-processing device is designed to form from the second data sequence, a third data sequence with signals $Y^\sim$, $X^\sim - Y^\sim$, and $Z^\sim - Y^\sim$, and to multiply this third data sequence with programmable coefficients L_gain, a_gain, and b_gain and to add programmable offsets to these products so that a fourth data sequence is produced, and for the $X^\sim - Y^\sim$, and $Z^\sim - Y^\sim$ assigned values of the fourth data sequence to add a product of the first color component and L_gain so that a fifth data sequence is produced, this fifth data sequence being back-transformed with the inverse conversion table, or with an adequate approximation through exponentiation with the third power, into the linear color space, so that a sixth sequence is produced with the signals X, Y, Z.

14. The digital image-processing device according to claim 1, wherein the image-processing device is designed to calculate and store an average value of the sample values between successive rows and columns so that an image is produced in a memory with twice the interpolated resolution, and in that an address computational device specifies a synchronous series of rational sampling points of a target grid for the sampling, and in that of the four color components available for each pixel, a color vector is selected whose address comes closest to a target value, and in that values of color vectors selected in this way are subjected to a subsequent color correction.

15. The digital image-processing device according to claim 1, wherein the image-processing device is designed such that an image data stream is sampled with a higher resolution, interpolated to twice the resolution, and then outputted to an end device with less than the sensor-side resolution.

16. The digital image-processing device according to claim 1, wherein the data buffer comprises a dual-port RAM.

* * * * *